June 18, 1935.　　　　G. WARFIELD　　　　2,005,281
AUTOMOBILE SAFETY APPLIANCE
Filed Jan. 16, 1935　　　5 Sheets-Sheet 1

Inventor
Gordon Warfield

By Clarence A. O'Brien
Attorney

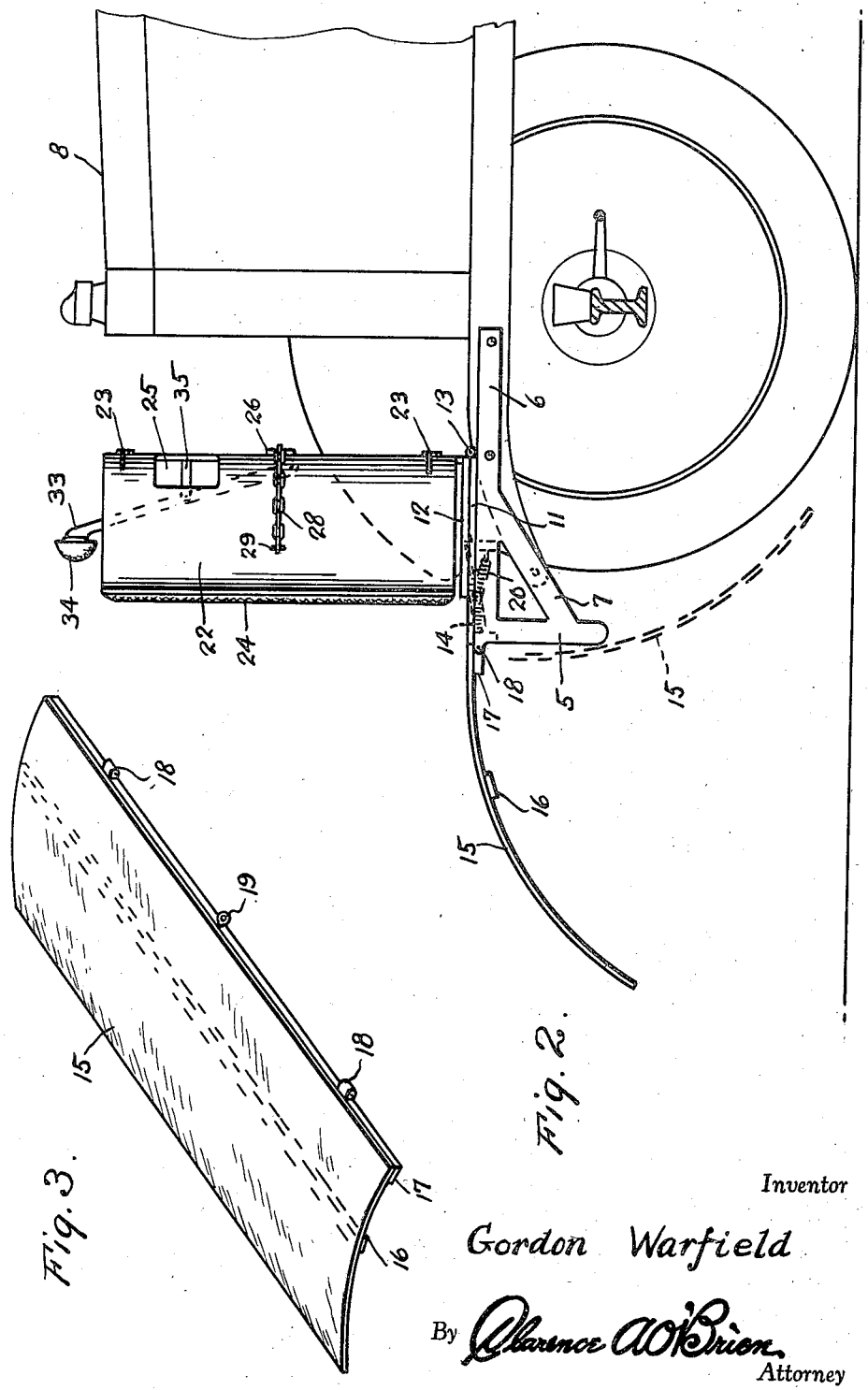

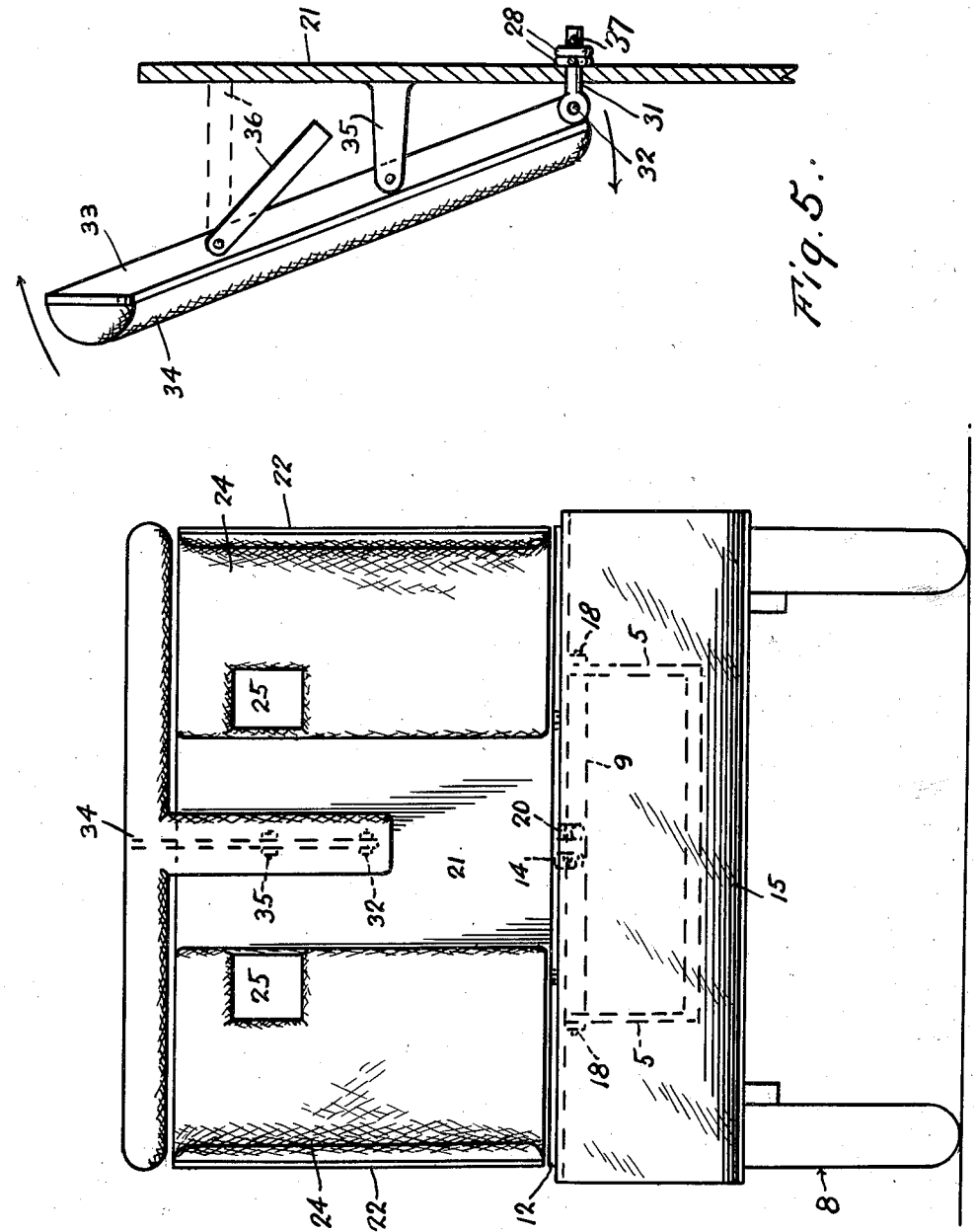

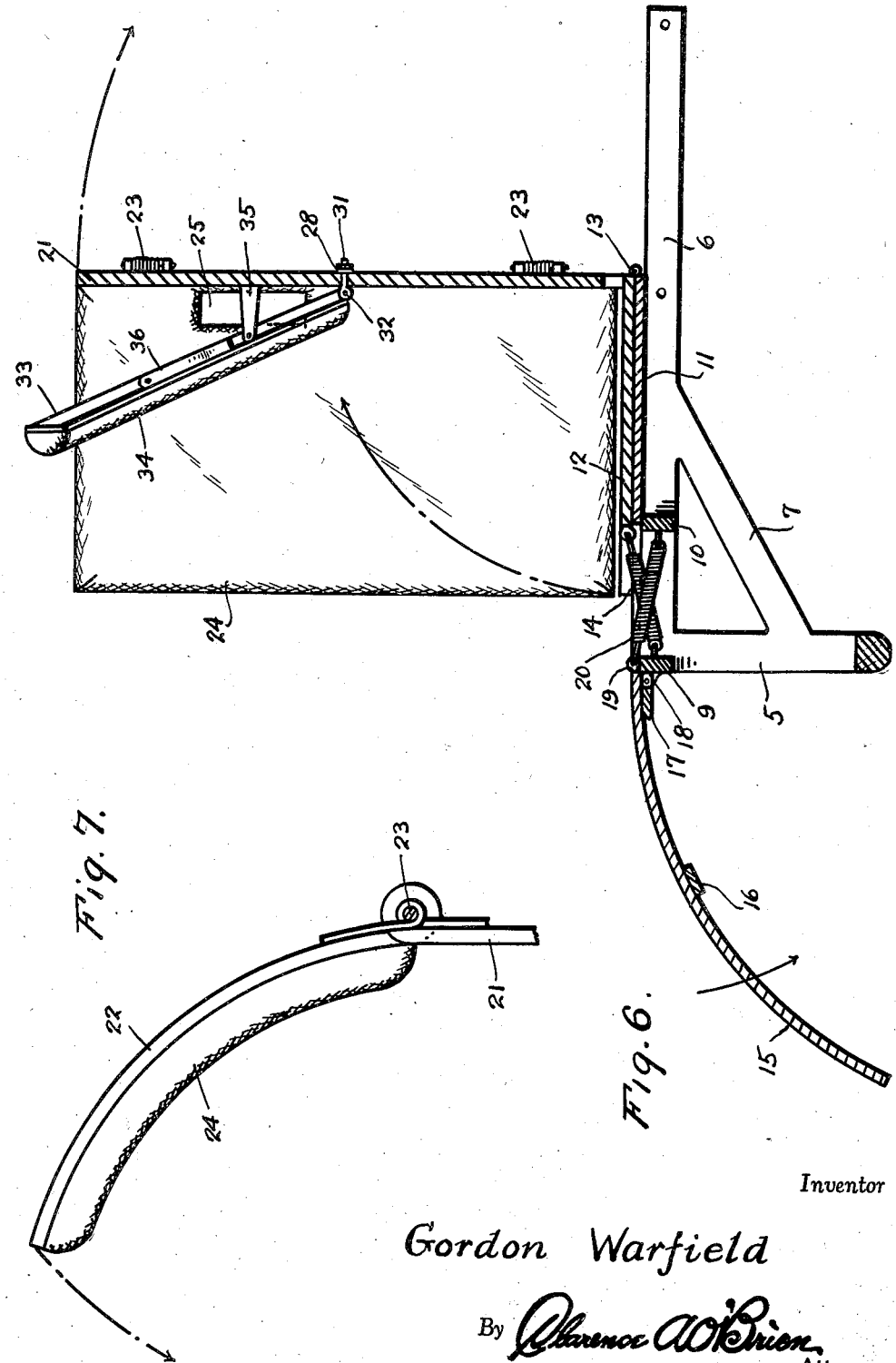

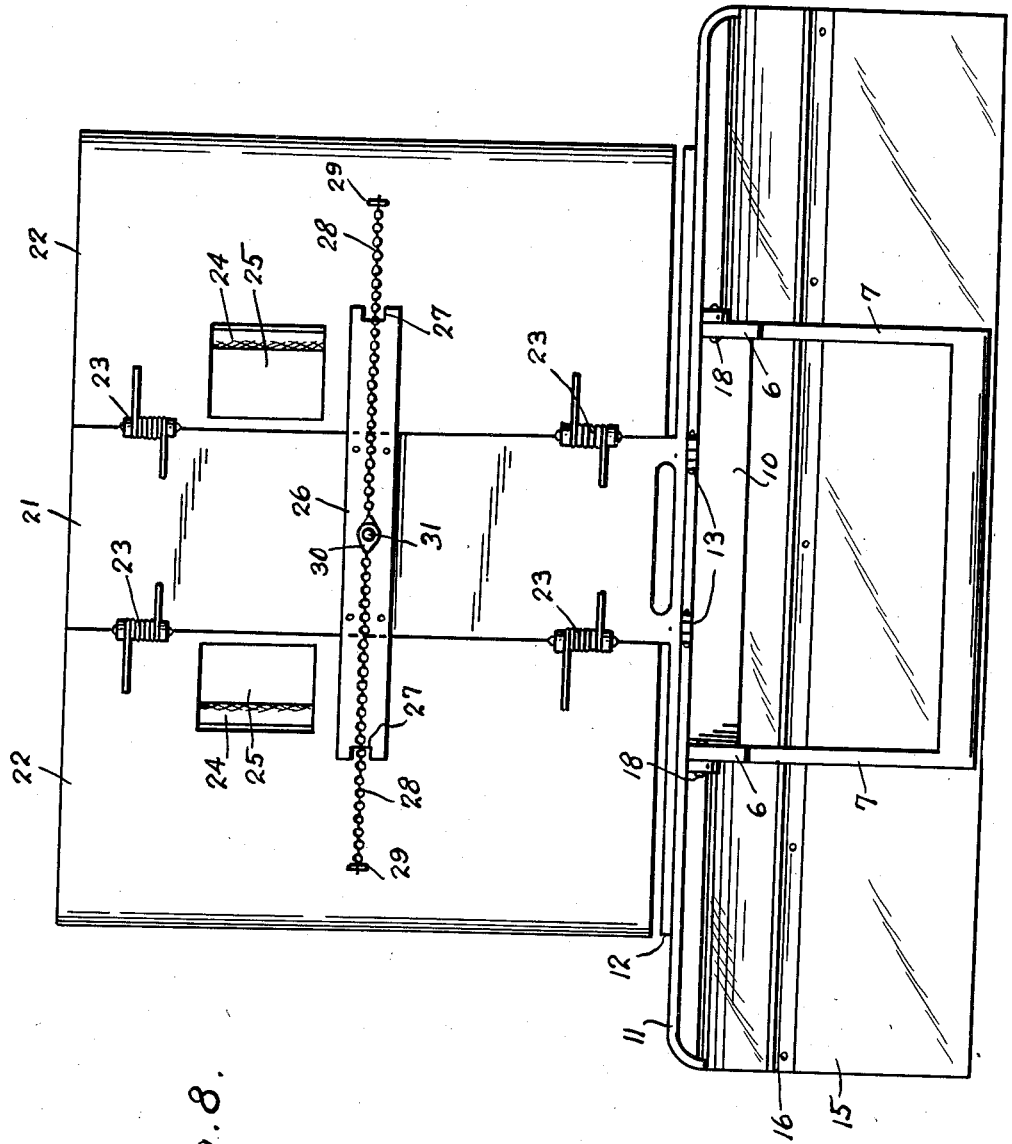

Patented June 18, 1935

2,005,281

UNITED STATES PATENT OFFICE 2,005,281

AUTOMOBILE SAFETY APPLIANCE

Gordon Warfield, Baltimore, Md.

Application January 16, 1935, Serial No. 2,885

3 Claims. (Cl. 293—24)

This invention appertains to new and useful improvements in automobiles and more particularly to a novel attachment for the front part of a vehicle contemplated to save life in the event a person is struck by an automobile having this equipment thereon.

The principal object of the present invention is to provide a safety appliance for automobiles adapted to grab and hold a person struck to prevent him from being thrown or run over.

Furthermore, other important objects and advantages of the invention will become apparent to the reader of the following specification.

In the drawings:

Figure 2 represents a side elevational view of the appliance attached to a vehicle.

Figure 3 represents a perspective view of the front flap.

Figure 4 represents a front elevational view of the appliance.

Figure 5 represents an enlarged fragmentary vertical sectional view through the intermediate portion of the appliance.

Figure 6 represents a sectional view taken substantially on the line 6—6 of Figure 1.

Figure 7 represents a fragmentary top plan view showing one of the wings.

Figure 8 represents a rear elevational view of the appliance.

Figure 1:
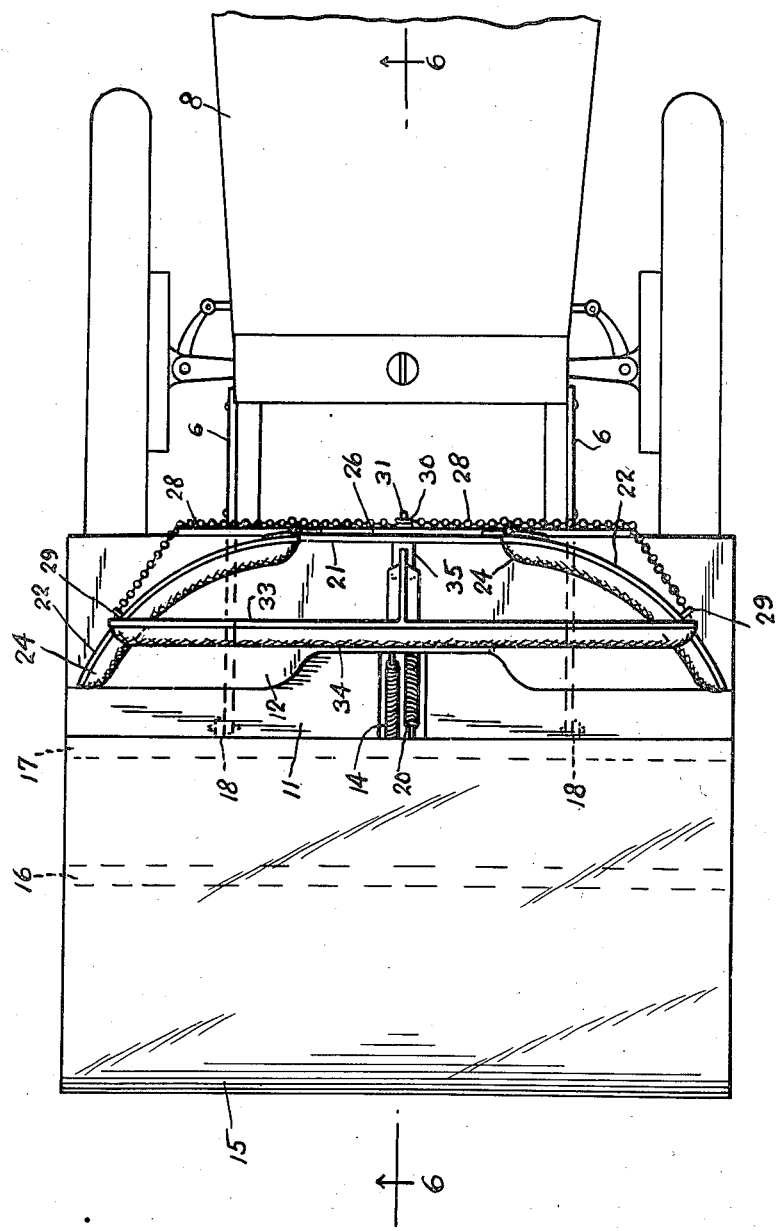
Figure 1 represents a top plan view of the appliance attached to the front portion of an automobile.

Referring to the drawings wherein like numerals designate like parts, it can be seen that the apparatus is in the form of a trap for catching and holding a human body. The device includes a frame consisting of a U-shaped member 5 vertically disposed and provided with laterally disposed bar extensions 6—6 extending from its leg portions and braced as at 7. The bars 6—6 are suitably secured to the chassis frame of the automobile which in the drawings is generally referred to by numeral 8. Between the upper end portions of the U-shaped member 5 is a cross bar 9, while slightly rearwardly of this bar 9 a second bar 10 is interposed between the bars 6—6 with its end suitably secured thereto.

Spanning the bars 6—6 is the stationary floor 11 to the rear end of which the upwardly swingable gauge 12 is hinged as at 13. A spring 14 is interposed between the forward end of the gate 12 and the cross member 9 for holding the gate in the manner substantially shown in Figure 6. Numeral 15 represents a transversely arcuate shaped front flap of elongated construction provided with a reinforcing beam 16 at its intermediate portion and a second reinforcing beam 17 at one longitudinal edge portion thereof at which edge portion is the connection 18 made with the cross member 9, shown in Figure 7. This edge portion of the flap 15 is provided with an eye 19 to which one end of the spring 20 connects, the opposite end of the spring 20 being connected to the cross member 10.

Upstanding from the rear edge portion of the bottom 11 is the back wall 21 to the vertical edge portions of which the horizontally arcuate shaped side wings 22 are hingedly connected by spring hinges 23. These wings are upholstered or suitably padded as at 24. The wings 22 are provided with openings 25 therein to afford ventilation when a person is caught within the grasp of these side wings.

As is clearly shown in Figures 1 and 8, an elongated bar 26 is secured horizontally across the back side of the wall 21, the end portions thereof extending a substantial distance beyond the vertical edge portions of the said side wall 21 being provided with notches 27.

A pair of chain sections 28—28 each have one end attached as at 29 to the rear side of a wing 22 while its opposite end is provided with a ring 30 as clearly shown in Figure 5, a stem 31 is slidable through an opening in the back wall 21 and extends through the overlapping rings 30 and in this manner the wings 22 are held in the open position shown in Figure 4 against the tension of the spring hinges 23. This stem 31 is hingedly connected as at 32 to the lower end of the T-shaped actuator 33 which is suitably padded as at 34 and operates on a fulcrum post 35. A prop 36 is employed and can be moved to the dotted line position shown in Figure 5 when the apparatus is to be made inoperative. Otherwise this prop can be disposed in the forward position shown in Figure 6. A readily breakable pin 37 is disposed through the rear end portion of the stem 31 as in the manner substantially shown in Figure 5.

It can now be seen, that when a person is struck by this appliance he will be prevented from getting under the wheels of the vehicle because of the freedom of the front flap 15 to move downwardly from the dotted line position shown in Figure 2. As the victim's head or upper portion of his body strikes the actuator 33, the same will tend to swing and strain on the readily breakable pin 37 will result in the shearing off the same so that the stem 31 will pull through the opening in the back wall 21, thus releasing the chain sections 28—28 so that the wings 22—22 are free to swing inwardly and grasp the person struck.

While the foregoing specification sets forth the invention in specific terms, it is to be understood that numerous changes in the details, size, materials may be resorted to without departing from the spirit and scope of the invention as claimed hereinafter.

What is claimed as new is:

1. A safety device for automobiles comprising a base structure adapted to be attached to the front portion of an automobile, a downwardly swingable front flap on the said base structure, an upstanding rear wall on the base structure, side wings supported by said wall, spring means for urging the wing members inwardly, and trip means adapted to hold the wing members apart until the trip member is struck.

2. A safety device for automobiles comprising a base structure adapted to be attached to the front portion of an automobile, a downwardly swingable front flap on the said base structure, an upstanding rear wall on the base structure, side wings supported by said wall, spring means for urging the wing members inwardly, and trip means adapted to hold the wing members apart until the trip member is struck, said trip means comprising a rockable actuator, a pivotal stem on one end portion of the actuator disposed through an opening in the said wall, a pair of chain sections each extending from one of the wing members and engaged over the said stem to hold the wing members in extended spring tensioned position.

3. A safety device for automobiles comprising a base structure adapted to be attached to the front portion of an automobile, a downwardly swingable front flap on the said base structure, an upstanding rear wall on the base structure, side wings supported by said wall, spring means for urging the wing members inwardly, and trip means adapted to hold the wing members apart until the trip member is struck, said trip means comprising a rockable actuator, a pivotal stem on one end portion of the actuator disposed through an opening in the said wall, a pair of chain sections each extending from one of the wing members and engaged over the said stem to hold the wing members in extended spring tensioned position, and a readily breakable pin disposed transversely through the stem to hold the chain sections on the stem.

GORDON WARFIELD.